United States Patent [19]

Kohsaka et al.

[11] Patent Number: 5,293,266
[45] Date of Patent: Mar. 8, 1994

[54] OPTICAL BEAM SCANNING APPARATUS

[75] Inventors: Jun Kohsaka; Hiromu Nakamura; Masanori Yamamoto; Shinya Sakanashi, all of Toyokawa, Japan

[73] Assignee: Minolta Camera Kabushiki Kaisha, Osaka, Japan

[21] Appl. No.: 990,512

[22] Filed: Dec. 15, 1992

[30] Foreign Application Priority Data

Oct. 30, 1992 [JP] Japan .................. 4-292977

[51] Int. Cl.⁵ ............................................. G02B 26/08
[52] U.S. Cl. ............................. 359/218; 359/217; 359/198; 310/51
[58] Field of Search ............... 359/212, 216, 217, 218, 359/219, 198; 310/40 R, 46, 51

[56] References Cited

U.S. PATENT DOCUMENTS

| | | | |
|---|---|---|---|
| 4,623,216 | 11/1986 | Sato et al. | 359/217 |
| 4,820,005 | 4/1989 | Hashimoto et al. | 359/218 |
| 4,892,372 | 1/1990 | Chonan et al. | 359/218 |
| 5,124,830 | 5/1992 | Omura et al. | 359/219 |
| 5,183,350 | 2/1993 | Kramer | 359/198 |
| 5,245,234 | 9/1993 | Okada et al. | 310/51 |

FOREIGN PATENT DOCUMENTS

| | | | |
|---|---|---|---|
| 382221 | 8/1990 | European Pat. Off. | 359/217 |
| 57-29004 | 2/1982 | Japan | 359/218 |
| 58-136014 | 8/1983 | Japan | 359/218 |
| 63-167328 | 7/1988 | Japan | 359/217 |

*Primary Examiner*—Loha Ben
*Attorney, Agent, or Firm*—Willian Brinks Hofer Gilson & Lione

[57] ABSTRACT

An optical beam scanning apparatus wherein a resin polygonal scanner deflects a light beam radiated from a laser diode as the polygonal scanner is rotating. The polygonal scanner is pressed by a pressing member against a scanner rest which rotates together with a rotary shaft of a motor and thus fixed on the scanner rest. The pressing member has a plurality of tabs, and the polygonal scanner is pressed evenly when the tabs pierce the polygonal scanner.

33 Claims, 6 Drawing Sheets

MODEL 1

MODEL 2

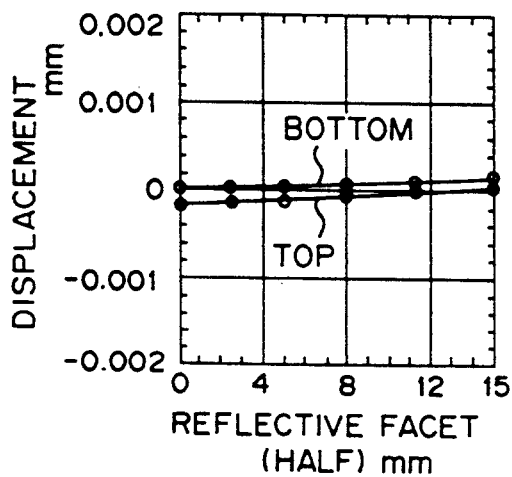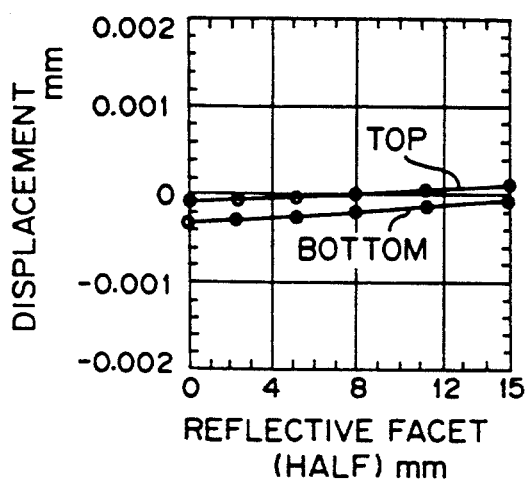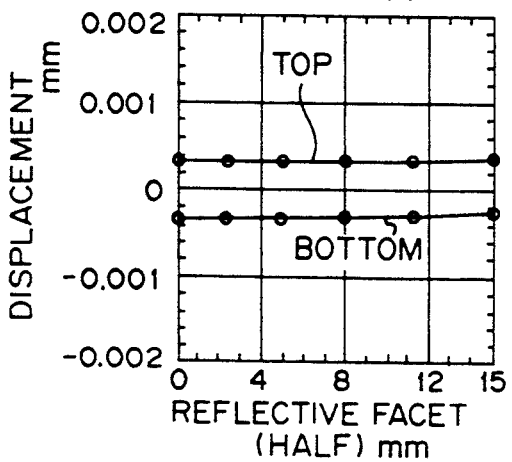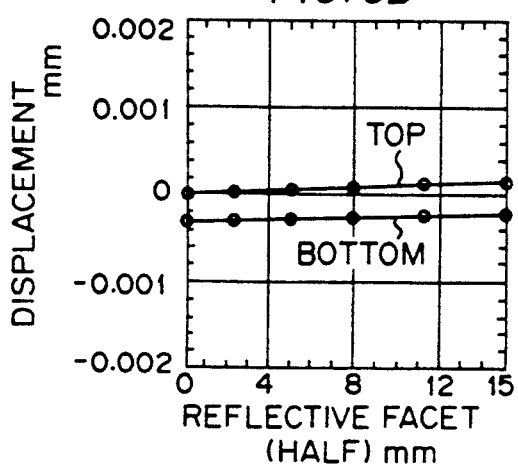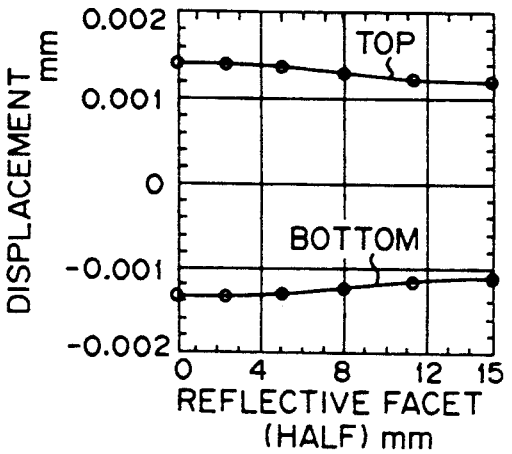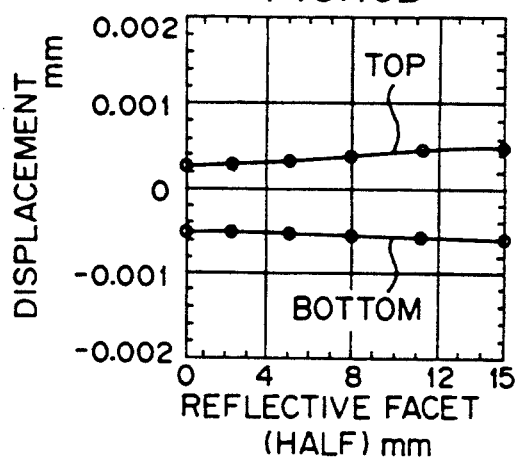

OPTICAL BEAM SCANNING APPARATUS

BACKGROUND OF THE INVENTION

1. Field of the Invention

The present invention relates to an optical beam scanning apparatus, and more particularly to an optical beam scanning apparatus wherein a rotating polygonal scanner deflects a light beam for scanning.

2. Description of Related Art

In an optical beam scanning apparatus which is to be installed in a printer or in an image reader, conventionally, a polygonal scanner has been provided. The polygonal scanner has a plurality of reflective facets on the periphery. The polygonal scanner is fastened to a rotary shaft of a motor and rotates at a constant speed with the rotation of the motor. Thereby, a light beam is reflected by the reflective facets of the polygonal scanner and deflected at a constant angular velocity.

Such polygonal scanners are generally made of metal like aluminum, or glass. However, in order for lightening, mass production and reduction of cost, U.S. Pat. No. 4,101,365 proposed that polygonal scanners be made of resin.

A polygonal scanner made of metal or glass is so hard that the polygonal scanner is hardly deformed when it is fastened to a rotary shaft of a motor. A polygonal scanner made of resin, on the other hand, is not very hard, and it may be deformed when it is fastened to a rotary shaft of a motor. The deformation of the reflective facets degrades the optical performance of the polygonal scanner.

SUMMARY OF THE INVENTION

It is an object of the present invention to provide an optical beam scanning apparatus which has a resin polygonal scanner which is hardly deformed when it is fastened to a rotary shaft.

Another object of the present invention is to provide an optical beam scanning apparatus which has a resin polygonal scanner whose reflective facets substantially do not slant with respect to a rotary shaft.

A further object of the present invention is to provide an optical beam scanning apparatus which has a resin polygonal scanner whose reflective facets are hardly put out of alignment when the polygonal scanner is fastened to a rotary shaft.

In order to attain the objects above, an optical beam scanning apparatus according to the present invention comprises a resin polygonal scanner; a motor having a rotary shaft; a scanner rest for supporting the polygonal scanner thereon, the scanner rest being rotatable together with the rotary shaft of the motor; and a pressing member which presses the polygonal scanner against the scanner rest to fasten the polygonal scanner to the rotary shaft. The pressing member presses the polygonal scanner at such points that forces caused by the pressure and applied to all the reflective facets will be substantially even. As a preferable way, a plurality of tabs are provided to the pressing member, and the polygonal scanner is pressed and securely fixed on the scanner rest when the tabs pierce the polygonal scanner.

In the above structure, the pressing member applies equal forces to all the reflective facets of the polygonal scanner, and it is unlikely that the reflective facets of the polygonal scanner are unevenly deformed. Accordingly, the optical performance of the optical beam scanning apparatus is not degraded. Specifically, occurrence of image jitters, inaccuracy in magnification, scanning pitch, etc. can be prevented.

It is preferred that the points where the pressing member presses the polygonal scanner are within an area which is directly supported by the scanner rest. This arrangement reduces the degree of slants of the reflective facets of the polygonal scanner with respect to the rotary shaft.

It is also preferred that each of the points where the pressing member presses the polygonal scanner is out of an area enclosed by lines between the axis of rotation and both ends of an effective reflective area of a reflective facet. This arrangement reduces the degree of misalignment of the reflective facets of the polygonal scanner.

BRIEF DESCRIPTION OF THE DRAWINGS

These and other objects and features of the present invention will be apparent from the following description with reference to the accompanying drawings in which:

FIGS. 8A and 8B are graphs showing displacement caused by deformation of the quadrangle scanner;

FIGS. 9A and 9B are graphs showing displacement caused by deformation of the quadrangle scanner;

FIGS. 10A and 10B are graphs showing displacement caused by deformation of the quadrangle scanner;

DETAILED DESCRIPTION OF THE PREFERRED EMBODIMENTS

An exemplary optical beam scanning apparatus according to the present invention is hereinafter described with reference to the accompanying drawings.

Figure 1:
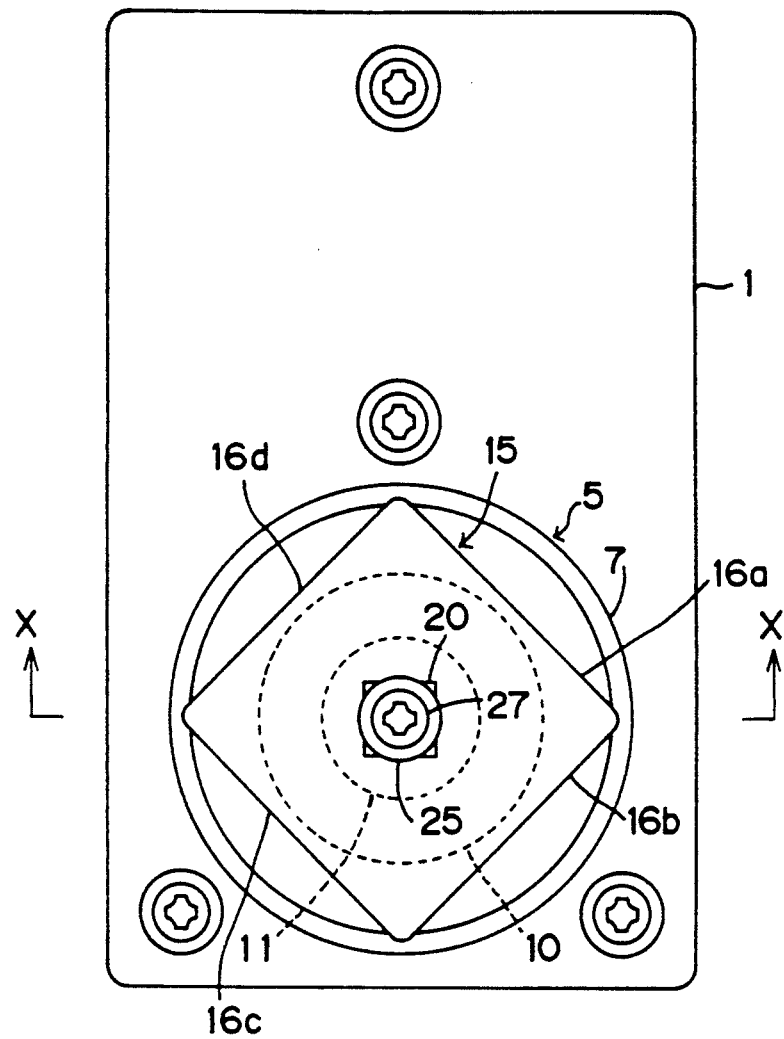
FIG. 1 is a plan view of an optical beam scanning apparatus which is a first embodiment of the present invention.
Figure 2:
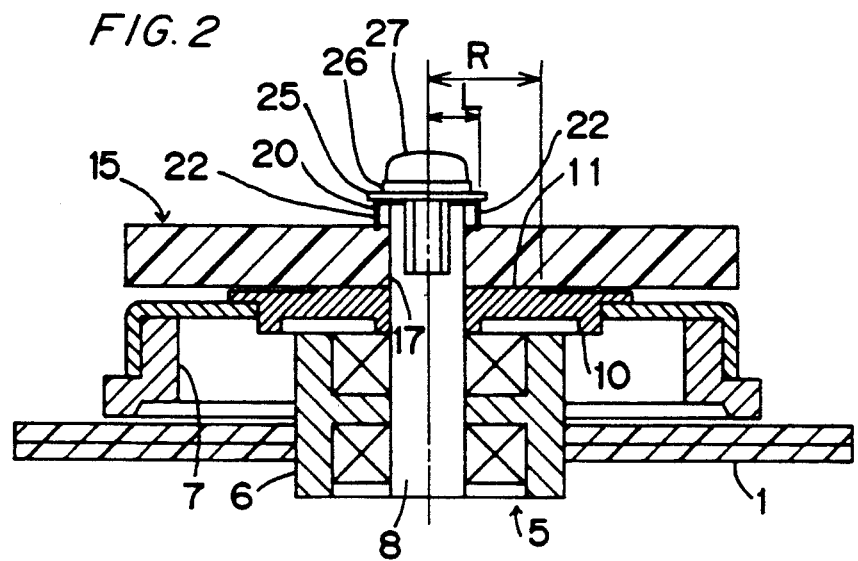
FIG. 2 is an enlarged sectional view of the optical beam scanning apparatus shown in FIG. 1, taken along X—X in FIG. 1.

Referring to FIGS. 1 and 2, the optical beam scanning apparatus includes a base plate, 1, a motor 5, a table 10, a polygonal scanner 15 and a pressing member 20.

The base plate 1 is hard enough to support the motor 5 and various electronic parts (see FIG. 3) of a driving circuit mounted thereon.

The motor 5 comprises a stator 6 fixed on the base plate 1, a rotor 7 which is rotatable around the stator 6, and a rotary shaft 8 disposed at the center of the stator 6. The table 10 is integrated with the rotor 7 and the rotary shaft 8 such that these three can rotate together. The table 10 is made of metal, and in the center, it has a circular scanner rest 11 which has a radius of R and has a polished upper surface.

Figure 3:
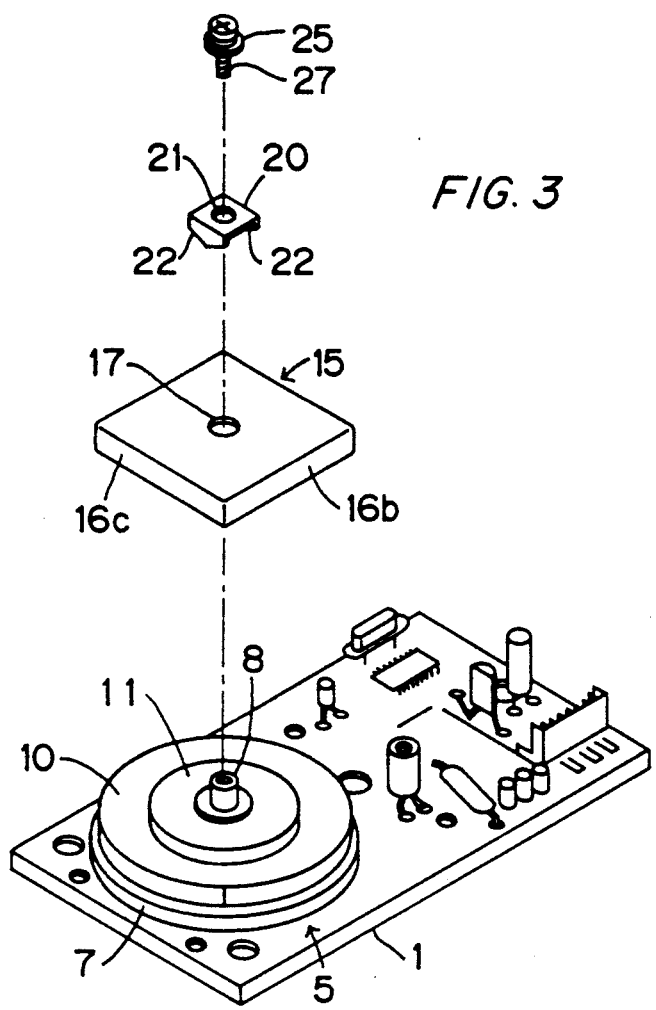
FIG. 3 is an exploded perspective view of the optical beam scanning apparatus.
Figure 4A:
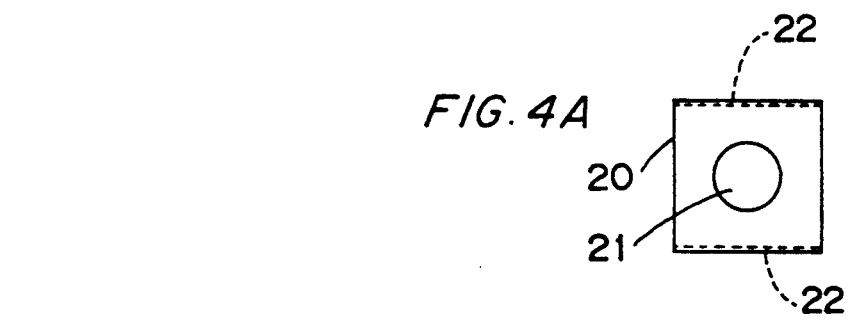
FIGS. 4A and 4B are a plan view and a front view respectively of a pressing member.
Figure 4B:
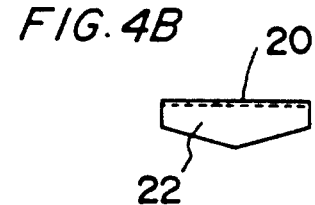

The polygonal scanner 15 is molded out of a synthetic resin such as polycarbonate and acrylic. The scanner 15 is substantially quadrangular in a plan view and has four reflective facets 16a, 16b, 16c and 16d on the periphery. The scanner 15 is mounted on the scanner rest 11 of the table 10 by engaging a center hole 17 of the scanner 15 with the rotary shaft 8. Thereafter, the pressing member 20 is placed on the top of the rotary shaft 8, and a screw 27 is engaged with a screw hole made at the top of the rotary shaft 8 with washers 25 and 26 in between. Thereby, the scanner 15 is fastened to the rotary shaft 8. The pressing member 20 is made of metal. As shown in FIGS. 3 and 4, the pressing member 20 has a center hole 21 in which the screw 27 is to be inserted and tabs 22 bent downward on mutually opposite two sides. The tabs 22 are wedges, and when the screw 27 is tightened, the tabs 22 are wedged into the scanner 15. Thereby, the scanner 15 is fixed on the table 10 around the rotary shaft 8.

Figure 5:
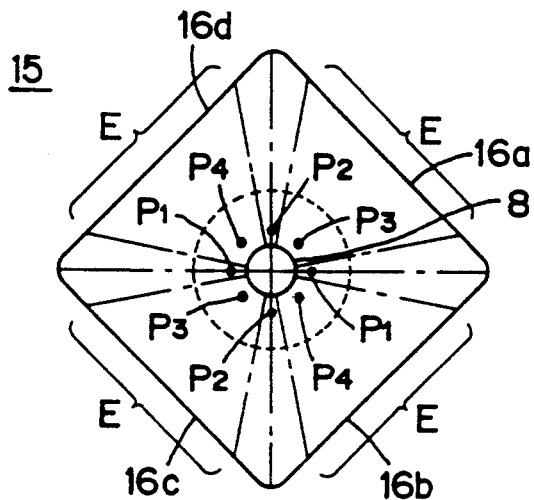
FIG. 5 is a plan view of a quadrangle scanner, showing pressing points.

FIG. 5 shows pressing points where the tabs 22 of the pressing member 20 are wedged into the scanner 15. In this embodiment, the pressing points are two points $P_1$ or $P_2$ on a diagonal line of the quadrangle of the scanner 15.

The above-structured optical beam scanning apparatus deflects a laser beam, which is radiated from a laser diode (not shown). More specifically, the laser beam is reflected by each of the reflective facets 16a through 16d of the scanner 15 and deflected with rotation of the scanner 15. The deflection of the laser beam results in formation of an electrostatic latent image on a photosensitive member. This optical beam scanning apparatus can be used as a print head of laser printers as described in U.S. Pat. Nos. 4,984,858 and 5,038,156.

The polygonal scanner 15, more specifically, is made of polycarbonate which has a Young's modulus of 21000 kg/cm$^2$ and a specific gravity (Poisson's ratio) of 1.2 (0.35), and the inscribed circle of the scanner 15 is 30 mm in diameter.

Figure 6:
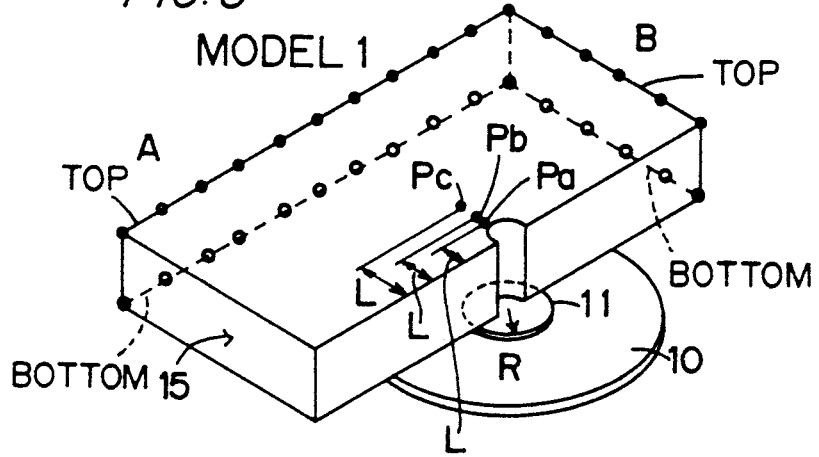
FIG. 6 is a perspective view of an analytic model 1 for an experiment of deformation of the quadrangle scanner.
Figure 7:
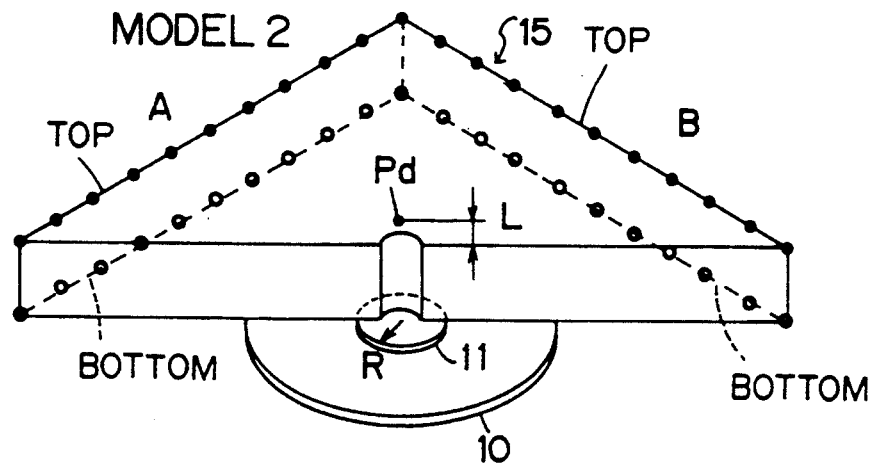
FIG. 7 is a perspective view of an analytic model 2 for the experiment of deformation of the quadrangle scanner.

Now, analysis of the relation between the pressing points of the tabs 22 on the scanner 15 and deformation of the reflective facets of the scanner 15 is described with reference to the graphs of FIGS. 8 through 12. The analysis was made according to the models 1 and 2 shown in FIGS. 6 and 7. According to the model 1, the pressing points are set on a line drawn between the centers of mutually opposite reflective facets A. Here, three cases were examined: a case wherein the pressing points are points Pa at a distance L of 3 mm from the center of the scanner 15 (the axis of rotation); a case wherein the pressing points are points Pb at a distance L of 4.5 mm from the center of the scanner 15; and a case wherein the pressing points are points Pc at a distance L of 7 mm from the center of the scanner 15. Displacement of one of the reflective facets A and its neighboring reflective facet B in each case is analyzed. According to the model 2, the pressing points are points Pd which are on a diagonal line of the quadrangular scanner 15 and are at a distance L of 3 mm from the center of the scanner 15, and displacement of a reflective facet A and its neighboring reflective facet B is analyzed. In each case of the models 1 and 2, the scanner rest 11 of the table 10 has a radius R of 5 mm, and a force of 1 kg is applied to each pressing point.

In the graphs of FIGS. 8 through 12, the x-axis indicates the distance from the center of the reflective facet A or B, and the y-axis indicates the displacement. The unit is mm. FIGS. 8A, 9A, 10A, 11A and 12A shown the displacement of the reflective facet A, and FIGS. 8B, 9B, 10B, 11B and 12B show the displacement of the reflective facet B. The dots in each graph correspond to the dots shown in FIG. 6 or 7. The origin of each graph corresponds to the center of a reflective facet A or B.

FIGS. 8A and 8B show the analysis in the case wherein the pressing points are the points Pa (l=3 mm) according to the model 1. FIGS. 9A and 9B show the analysis in the case wherein the pressing points are points Pb (L=4.5 mm) according to the model 1. FIGS. 10A and 10B show the analysis in the case wherein the pressing points are the points Pc (L=7 mm) according to the model 1. As is apparent from these graphs, the smaller the distance L, the smaller the displacement of the reflective facets A and B. In the case wherein the pressing points are the points Pc, the distance L between the center of the scanner 15 and the points Pc is larger than the radius R of the scanner rest 11. In this case, the displacement of the reflective facets A and B is especially large, and the reflective facets A and B slants remarkably with respect to the rotary shaft 8. Accordingly, it is preferred that the distance L between the pressing points and the center of the scanner 15 is smaller than the radius R of the scanner rest 11. In other words, preferably, the pressing points are within the area of the scanner rest 11.

Figure 11A:
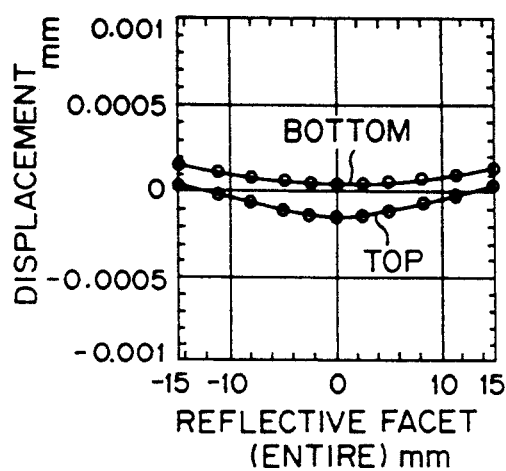
FIGS. 11A and 11B are graphs showing displacement caused by deformation of the quadrangle scanner.
Figure 11B:
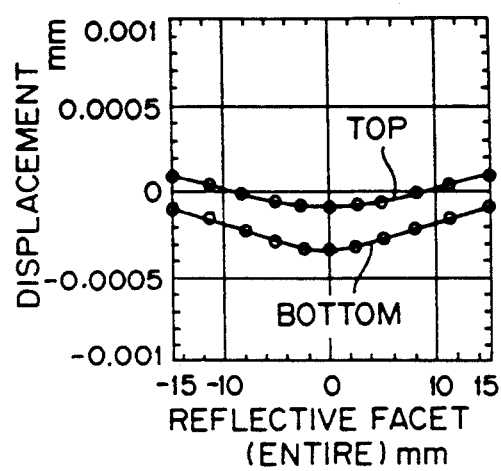
Figure 12A:
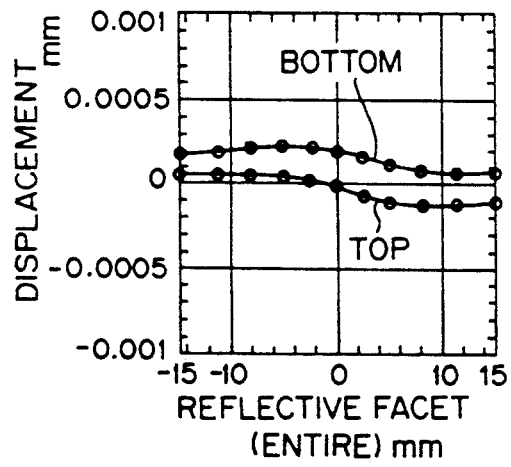
FIGS. 12A and 12B are graphs showing displacement caused by deformation of the quadrangle scanner.
Figure 12B:
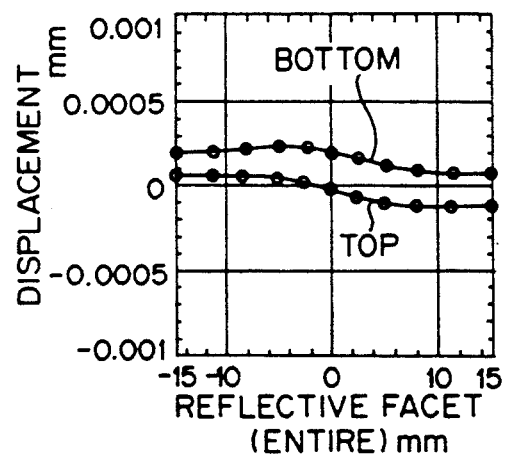

FIGS. 11A and 11B, like FIGS. 8A and 8B, show the analysis in the case wherein the pressing points are the points Pa. FIGS. 8A and 8B show the displacement of the half of the reflective facets A and B respectively, while FIGS. 11A and 11B show the displacement of the entire reflective facets A and B respectively. FIGS. 12A and 12B show the analysis according to the model 2. Each of the pressing points (points $P_3$ or $P_4$ shown in FIG. 5) according to the model 1 is considered to be placed on the upper surface of the scanner 15 within the area enclosed by lines drawn between the center of the scanner 15 and both ends of the effective reflective area E of the corresponding reflective facet 16a, 16b, 16c or 16d. Each of the pressing points (points $P_1$ or $P_2$ shown in FIG. 5) according to the model 2 is considered to be placed on the upper surface of the scanner 15 out of the area enclosed by lines drawn between the center of the scanner 15 and both ends of the effective reflective area E of the corresponding reflective facet 16a, 16b, 16c or 16d. The effective reflective area means the area of each reflective facet which is practically used for deflection of a laser beam. FIGS. 11A and 11B are to be compared with FIGS. 12A and 12B. Upon the comparison, the model 2 is preferable to the model 1 because the reflective facets A and B are similarly displaced in the model 2.

In this embodiment, the two tabs 22 of the pressing member 20 press the quadrangular scanner 15 at two points $P_1$ or $P_2$ according to the model 2 or $P_3$ or $P_4$ according to the model 1. Moreover, it is possible that the quadrangular scanner 15 is pressed at four points $P_1$ and $P_2$ according to the model 2 or $P_3$ and $P_4$ according to the model 1. As is apparent from the analysis, however, it is preferred that the pressing points are on one or two diagonal lines of the quadrangle of the scanner 15. Further, since too many pressing points cause imbalance of the pressure, it is the most desired that the scanner 15 is pressed at two points $P_1$ or $P_2$ on a diagonal line of the quadrangle. In this embodiment, the tabs 22 press the polygonal scanner 15 because pressing the scanner 15 at points causes less displacement of the reflective facets 16a through 16d than pressing the scanner at planes.

Figure 13:
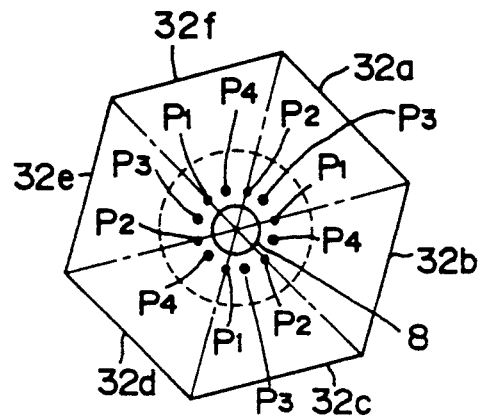
FIG. 13 is a plan view of a hexagonal scanner, showing pressing points.

FIG. 13 shows a resin hexagonal scanner 31 which has six reflective facets 32a through 32f on the periphery. The hexagonal scanner 31 is pressed by the pressing member 20 at three points $P_1$ or $P_2$ which are on lines drawn between the axis of rotation and every other corner of the hexagon, or at six points $P_1$ and $P_2$. These cases are according to the above-described model 2. Alternatively, the hexagonal scanner 31 is pressed at three points $P_3$ or $P_4$ which are on lines drawn between the axis of rotation and the centers of every other side of the hexagon, or at six points $P_3$ and $P_4$. These cases are according to the above-described model 1.

Figure 14:
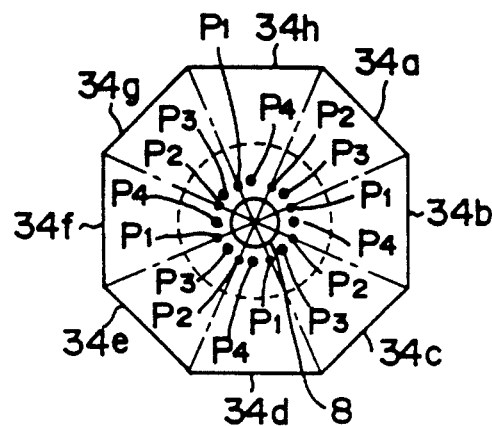
FIG. 14 is a plan view of an octagonal scanner, showing pressing points.

FIG. 14 shows a resin octagonal scanner 33 which has eight reflective facets 34a through 34h. The octagonal scanner 33 is pressed by the pressing member 20 at four points $P_1$ or $P_2$ which are on lines drawn between the axis of rotation and every other corner of the octagon, or at eight points $P_1$ and $P_2$. Alternatively, the octagonal scanner 33 is pressed at four points $P_3$ or $P_4$ which are on lines drawn between the axis of rotation and the centers of every other side of the octagon, or at eight points $P_3$ and $P_4$.

Figure 15:
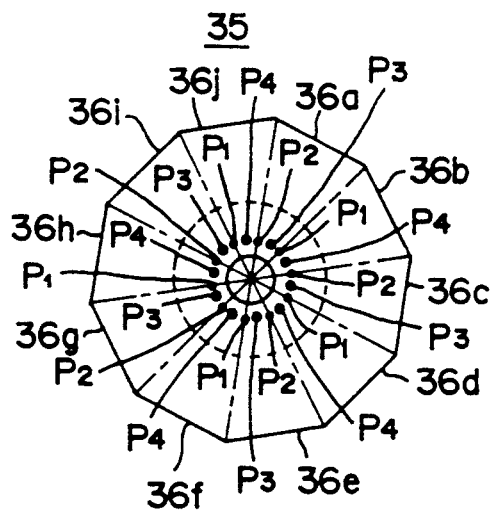
FIG. 15 is a plan view of a decagonal scanner, showing pressing points.

FIG. 15 shows a resin decagonal scanner 35 which has ten reflective facets 36a through 36j. The decagonal scanner 35 is pressed by the pressing member 20 at five points $P_1$ or $P_2$ which are on lines drawn between the axis of rotation and every other corner of the decagon, or at ten points $P_1$ and $P_2$. Alternatively, the decagonal scanner 35 is pressed at five points $P_3$ or $P_4$ which are on lines drawn between the axis of rotation and the centers of every other side of the decagon, or at ten points $P_3$ and $P_4$.

Figure 16:
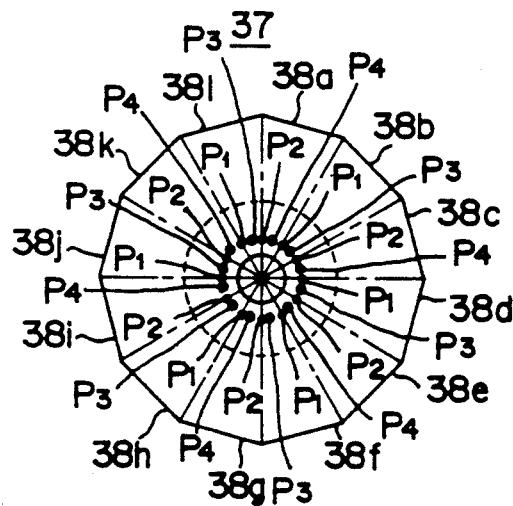
FIG. 16 is a plan view of a duodegonal scanner, showing pressing points.

FIG. 16 shows a resin duodegonal scanner 37 which has twelve reflective facets 38a through 38l. The duodegonal scanner 37 is pressed by the pressing member 20 at six points $P_1$ or $P_2$ which are on lines drawn between the axis of rotation and every other corner of the duodegon, or at twelve points $P_1$ and $P_2$. Alternatively, the duodegonal scanner 37 is pressed at six points $P_3$ or $P_4$ which are on lines drawn between the axis of rotation and the centers of every other side of the duodegon, or at twelve points $P_3$ and $P_4$.

Although the present invention has been described in connection with the preferred embodiments above, it is to be noted that various changes and modifications are possible to those who are skilled in the art. Such changes and modifications are to be understood as being within the scope of the invention.

For example, the polygonal scanner may be made of a synthetic resin such as acrylic as well as polycarbonate.

What is claimed is:

1. An optical beam scanning apparatus comprising:
   a polygonal scanner which is made of resin and has a plurality of reflective facets on its periphery;
   a motor which has a rotary shaft for rotating the polygonal scanner;
   a scanner rest for supporting the polygonal scanner thereon, the scanner rest being rotatable together with the rotary shaft of the motor; and
   a pressing member which presses the polygonal scanner against the scanner rest to fasten the polygonal scanner to the rotary shaft of the motor, the pressing member pressing the polygonal scanner at such points that forces caused by the pressure and applied to all the reflective facets will be substantially even.

2. An optical beam scanning apparatus as claimed in claim 1, wherein the polygonal scanner has four reflective facets, and the pressing member presses the polygonal scanner at two points.

3. An optical beam scanning apparatus as claimed in claim 2, wherein the two points where the pressing member presses the polygonal scanner are on a diagonal line drawn between two corners of the polygonal scanner and symmetrical with respect to an axis of rotation of the polygonal scanner.

4. An optical beam scanning apparatus as claimed in claim 1, wherein the polygonal scanner has four reflective facets, and the pressing member presses the polygonal scanner at four points.

5. An optical beam scanning apparatus as claimed in claim 4, wherein the four points where the pressing member presses the polygonal scanner are distributed such that each point corresponds to each reflective facet.

6. An optical beam scanning apparatus as claimed in claim 1, wherein the polygonal scanner has six reflective facets, and the pressing member presses the polygonal scanner at three points.

7. An optical beam scanning apparatus as claimed in claim 6, wherein the three points where the pressing member presses the polygonal scanner are on lines drawn between an axis of rotation of the polygonal scanner and every other corner of the polygonal scanner respectively and are at a same distance from the axis of rotation.

8. An optical beam scanning apparatus as claimed in claim 1, wherein the polygonal scanner has six reflective facets, and the pressing member presses the polygonal scanner at six points.

9. An optical beam scanning apparatus as claimed in claim 8, wherein the six points where the pressing member presses the polygonal scanner are distributed such that each point correspond to each reflective facet.

10. An optical beam scanning apparatus as claimed in claim 1, wherein the polygonal scanner has eight reflective facets, and the pressing member presses the polygonal scanner at four points.

11. An optical beam scanning apparatus as claimed in claim 10, wherein the four points where the pressing member presses the polygonal scanner are on lines drawn between an axis of rotation of the polygonal scanner and every other corner of the polygonal scanner respectively and are at a same distance from the axis of rotation.

12. An optical beam scanning apparatus as claimed in claim 1, wherein the polygonal scanner has eight reflective facets, and the pressing member presses the polygonal scanner at eight points.

13. An optical beam scanning apparatus as claimed in claim 12, wherein the eight points where the pressing member presses the polygonal scanner are distributed such that each point corresponds to each reflective facet.

14. An optical beam scanning apparatus as claimed in claim 1, wherein the polygonal scanner has ten reflective facets, and the pressing member presses the polygonal scanner at five points.

15. An optical beam scanning apparatus as claimed in claim 14, wherein the five points where the pressing member presses the polygonal scanner are on lines drawn between an axis of rotation of the polygonal scanner and every other corner of the polygonal scanner respectively and are at a same distance from the axis of rotation.

16. An optical beam scanning apparatus as claimed in claim 1, wherein the polygonal scanner has ten reflective facets, and the pressing member presses the polygonal scanner at ten points.

17. An optical beam scanning apparatus as claimed in claim 16, wherein the ten points where the pressing member presses the polygonal scanner are distributed such that each point corresponds to each reflective facet.

18. An optical beam scanning apparatus as claimed in claim 1, wherein the polygonal scanner has twelve reflective facets, and the pressing member presses the polygonal scanner at six points.

19. An optical beam scanning apparatus as claimed in claim 18, wherein the six points where the pressing member presses the polygonal scanner are on lines drawn between an axis of rotation of the polygonal scanner and every other corner of the polygonal scanner respectively and are at a same distance from the axis of rotation.

20. An optical beam scanning apparatus as claimed in claim 1, wherein the polygonal scanner has twelve reflective facets, and the pressing member presses the polygonal scanner at twelve points.

21. An optical beam scanning apparatus as claimed in claim 20, wherein the twelve points where the pressing member presses the polygonal scanner are distributed such that each point corresponds to each reflective facet.

22. An optical beam scanning apparatus as claimed in claim 1, wherein the pressing member is made of a hard material.

23. An optical beam scanning apparatus as claimed in claim 1, wherein the pressing member is fastened to the rotary shaft by a screw.

24. An optical beam scanning apparatus as claimed in claim 1, wherein the pressing member has a plurality of tabs, and the pressing member presses the polygonal scanner when the tabs pierce the polygonal scanner.

25. An optical beam scanning apparatus comprising:
a polygonal scanner which is made of resin and has a plurality of reflective facets in its periphery;
a motor which has a rotary shaft for rotating the polygonal scanner;
a scanner rest for supporting the polygonal scanner thereon, the scanner rest being rotatable together with the rotary shaft of the motor; and
a pressing member which presses the polygonal scanner against the scanner rest to fasten the polygonal scanner to the rotary shaft of the motor, the pressing member pressing the polygonal scanner at points within an area supported by the scanner rest.

26. An optical beam scanning apparatus as claimed in claim 25, wherein the polygonal scanner is in contact with the scanner rest entirely within a first distance from an axis of rotation of the polygonal scanner, and the points where the pressing member presses the polygonal scanner are at a second distance smaller than the first distance from the axis of rotation.

27. An optical beam scanning apparatus as claimed in claim 25, wherein the pressing member is made of a hard material.

28. An optical beam scanning apparatus as claimed in claim 25, wherein the pressing member is fastened to the rotary shaft by a screw.

29. An optical beam scanning apparatus as claimed in claim 25, wherein the pressing member has a plurality of tabs, and the pressing member presses the polygonal scanner when the tabs pierce the polygonal scanner.

30. An optical beam scanning apparatus comprising:
a polygonal scanner which is made of resin and has a plurality of reflective facets in its periphery;
a motor which has a rotary shaft for rotating the polygonal scanner;
a scanner rest for supporting the polygonal scanner thereon, the scanner rest being rotatable together with the rotary shaft of the motor; and
a pressing member which presses the polygonal scanner against the scanner rest to fasten the polygonal scanner to the rotary shaft of the motor, the pressing member pressing the polygonal scanner at points each of which is on an upper surface of the polygonal scanner out of an area enclosed by lines from an axis of rotation of the polygonal scanner and both ends of an effective reflective area of each reflective facet.

31. An optical beam scanning apparatus as claimed in claim 30, wherein the pressing member is made of a hard material.

32. An optical beam scanning apparatus as claimed in claim 30, wherein the pressing member is fastened to the rotary shaft by a screw.

33. An optical beam scanning apparatus as claimed in claim 30, wherein the pressing member has a plurality of tabs, and the pressing member presses the polygonal scanner when the tabs pierce the polygonal scanner.

* * * * *